Patented Sept. 2, 1941

2,254,877

UNITED STATES PATENT OFFICE 2,254,877

METHOD OF PREPARING 2(P-NICOTINYL-AMINOBENZENESULFONAMIDE) PYRIDINE

Elmer H. Stuart, Indianapolis, Ind., assignor to Eli Lilly and Company, Indianapolis, Ind., a corporation of Indiana No Drawing. Application April 12, 1940, Serial No. 329,342

1 Claim. (Cl. 260—295)

This invention relates to a process of preparing 2(p-nicotinylaminobenzenesulfonamido) pyridine and the salts of this composition.

The composition—2(p-nicotinylaminobenzenesulfonamido) pyridine—and its salts are described and claimed in United States Patent No. 2,186,773, granted to Elmer H. Stuart on January 9, 1940. As stated in that patent, this new compound has a marked protective effect against certain infections, such as streptococcal infections.

The process in accordance with this invention comprises treating a nicotinyl chloride, such as nicotinyl chloride hydrochloride, with aniline (aminobenzene) to form a nicotinylaminobenzene. The nicotinylaminobenzene, such as nicotinylaminobenzene or its salts, is then treated with chlorosulphonic acid to form a p-nicotinylaminobenzenesulfonylchloride. Desirably nicotinylaminobenzene sulfate is employed in this step, and other nicotinylaminobenzenes may be converted into nicotinylaminobenzene sulfate by reacting with sulfuric acid. The p-nicotinylaminobenzenesulfonylchloride is then reacted with alpha-aminopyridine. The resulting product is 2(p-nicotinylaminobenzenesulfonamido) pyridine or nicotinylsulfapyridine. Salts of the 2(p-nicotinylaminobenzenesulfonamido) pyridine may be formed in the same manner as that described in the above noted patent. The nicotinyl chloride hydrochloride employed in the production of the 2(p-nicotinylaminobenzenesulfonamido) pyridine may be prepared by treating nicotinic acid with thionyl chloride.

The preferred procedure of carrying out the process of this invention is as follows:

Approximately equal molecular proportions of nicotinyl chloride hydrochloride and aniline are mixed together in a container which is cooled by an ice bath. A vigorous reaction ensues and it is preferable that the heat generated in this reaction be dissipated as quickly as possible. To this end, a few pieces of ice may be added to the reaction mixture. The reaction which takes place is as follows:

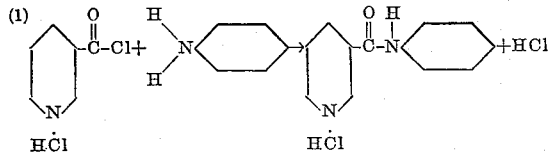

The reacting mixture is permitted to stand for some hours and preferably over night. In the event that the water present in the mixture is not sufficient to dissolve the nicotinyl aminobenzene hydrochloride which is formed, an amount of water is added which completely dissolves the reaction product. Sodium hydroxide or other suitable base is then added until the solution is alkaline to litmus. A precipitate is formed which is nicotinylaminobenzene. Practically all of the nicotinylaminobenzene is precipitated since the base is substantially insoluble in water. Preferably the nicotinylaminobenzene base is converted to the sulfate. The base itself is markedly soluble in alcohol and chloroform. Nicotinylaminobenzene sulfate is prepared by treating one mol of nicotinylaminobenzene with approximately one-half mol of sulphuric acid and evaporating to dryness, preferably in a vacuum.

To prepare a p-nicotinylaminobenzenesulfonyl chloride, a nicotinylaminobenzene, such as nicotinylaminobenzene sulfate, is treated with chlorosulfonic acid. One mol of nicotinylaminobenzene sulfate is added slowly to approximately ten moles of chlorosulfonic acid. For this purpose, the reacting mixture may be cooled in a water bath. It is desirable to keep the temperature of the reacting mixture below 35° C. since there is a possibility that, at higher temperatures, side reactions might occur. After the nicotinylaminobenzene sulfate has been completely added to the chlorosulfonic acid, the mixture is permitted to stand several hours and preferably over night. The reaction which takes place is as follows:

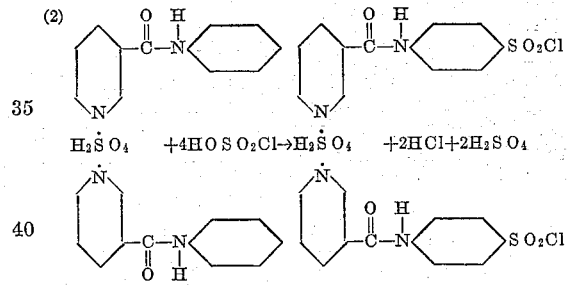

In order to remove the unreacted chlorosulfonic acid, the reacting mixture is poured while stirring into about five litres of cracked ice. After about ten minutes has elapsed the mixture is filtered. It is highly desirable that the mixture be filtered as soon as possible after treatment with the ice to prevent hydrolysis of the p-nicotinylaminobenzenesulfonyl chloride. The residue, after filtration, is dried in vacuum and the yield is approximately the same as the amount of the nicotinylaminobenzene sulfate which was initially treated.

The formation of p-nicotinylaminobenzenesulfonyl chloride may be performed in the presence of a suitable solvent, such as chloroform. In this case the nicotinylaminobenzene base is dissolved in chloroform. The chlorosulfonic acid is added, slowly while stirring, to the chloroform solution of nicotinylaminobenzene. If the volume of solvent is relatively large, it assists materially in dissipating the heat formed in the reaction. The reaction mixture is permitted to stand several hours, preferably over night, and most of the solvent is removed by evaporation in vacuum. The reaction mixture is then poured into cracked ice as in the preceding example.

To prepare the 2(p-nicotinylaminobenzenesulfonamido) pyridine, a nicotinylaminobenzenesulfonylchloride, such as p-nicotinylaminobenzenesulfonylchloride sulfate, is reacted with alpha-aminopyridine. The reaction is carried out in a suitable solvent, such as pyridine or dioxane. If pyridine is employed as a solvent, approximately two moles of alpha-aminopyridine are dissolved in about one litre of pyridine. One and one-tenth moles of p-nicotinylaminobenzenesulfonylchloride sulfate are then added and the mixture stirred. The p-nicotinylaminobenzenesulfonyl chloride sulfate dissolves, after stirring, and the mixture is permitted to stand several hours, preferably over night. Approximately 5 litres of distilled water are added and the reaction product, 2(p-nicotinylaminobenzenesulfonamido) pyridine, which is insoluble in water, separates out. The reaction which takes place is as follows:

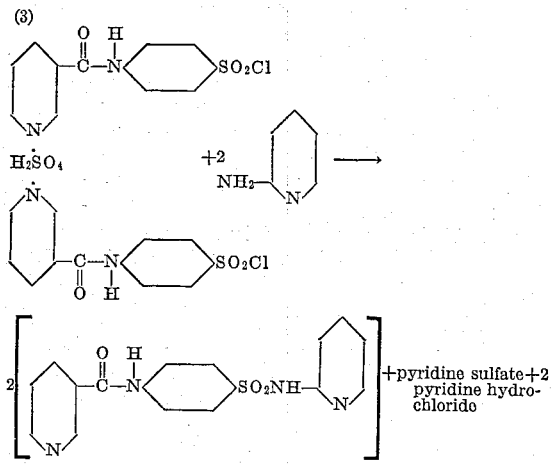

The crystals of 2(p-nicotinylaminobenzenesulfonamido) pyridine are filtered off and may be purified by crystalization with boiling water.

In the event that dioxane is used, about six moles of alpha-aminopyridine are dissolved in three litres of dioxane. Approximately one mol of p-nicotinylaminobenzenesulfonylchloride are mixed with this solution and the mixture permitted to stand several hours or preferably over night. The solvent is then evaporated under vacuum on a water bath. Five litres of water are added and heated to boiling. The hot water dissolves the alpha-aminopyridine salts formed in the reaction. The solution is then permitted to cool, the 2(p-nicotinylaminobenzeneamido) pyridine is filtered and washed free of salts. The crystalized 2(p-nicotinylaminobenzeneamido) pyridine is then, if desired, recrystalized from boiling water. The melting point of the 2(p-nicotinylaminobenzeneamido) pyridine obtained by this method is about 261° C. It is preferable to employ pyridine as the solvent instead of the dioxane since the pyridine neutralizes the acid set free by the reaction, whereas dioxane does not. Consequently when dioxane is employed a greater amount of alpha-aminopyridine or the addition of some other base such as sodium carbonate or sodium bicarbonate is required.

The 2(p-nicotinylaminobenzeneamido) pyridine prepared by the method outlined may be purified as described in the above noted patent. Further, salts of the base may be formed in the manner described in that patent. The salts produced from this base may be, as stated in the above noted patent, those formed by reaction with strong acids and bases such as hydrochloric acid, sulphuric acid, and various sulfonic acids, and the bases of the alkali metals, the alkaline-earth metals, the lower-alkyl amines, the lower-alkanol amines, and the lower diamines. The term a 2(p-nicotinylaminobenzeneamido) pyridine in the appended claim denotes any salt or other derivative of 2(p-nicotinylaminobenzeneamido) pyridine as well as the base 2(p-nicotinylaminobenzeneamido) pyridine itself.

While preferred embodiments of this invention have been described, various modifications may be made therein without departing from the scope of the appended claim.

What is claimed is:

The process of producing a 2(p-nicotinylaminobenzenesulfonamido) pyridine which comprises treating nicotinyl chloride hydrochloride with aniline to form nicotinylaminobenzenehydrochloride, converting the nicotinylaminobenzenehydrochloride into nicotinylaminobenzenesulfate, subjecting the resulting product to the action of chlorosulfonic acid to form p-nicotinylaminobenzenesulfonylchloride sulfate, and treating the resulting p-nicotinylaminobenzenesulfonylchloride sulfate with alpha-aminopyridine.

ELMER H. STUART.